United States Patent
Tsai

(12) 
(10) Patent No.: US 6,501,716 B2
(45) Date of Patent: Dec. 31, 2002

(54) METHOD FOR DETERMINING VERTICAL OR HORIZONTAL OPERATION OF OPTICAL DISK DRIVER

(75) Inventor: Yao-Chou Tsai, Taipei (TW)

(73) Assignee: Lite-On It Corporation, Taipei (TW)

(*) Notice: Subject to any disclaimer, the term of this patent is extended or adjusted under 35 U.S.C. 154(b) by 123 days.

(21) Appl. No.: 09/801,822

(22) Filed: Mar. 9, 2001

(65) Prior Publication Data

US 2002/0126592 A1 Sep. 12, 2002

(51) Int. Cl.7 .................................................. G11B 7/00
(52) U.S. Cl. ................ 369/44.35; 369/44.32; 369/53.1
(58) Field of Search ........................... 369/44.25, 44.27, 369/44.28, 44.29, 44.32, 44.34, 44.35, 47.1, 53.1, 53.12, 53.18, 53.19, 124.15, 124.12, 124.01

(56) References Cited

U.S. PATENT DOCUMENTS

| | | | | |
|---|---|---|---|---|
| 5,130,854 A | * | 7/1992 | Suzuki | 359/823 |
| 5,450,379 A | * | 9/1995 | Fujimori et al. | 369/275.1 |
| 5,452,278 A | * | 9/1995 | Kwon et al. | 369/44.27 |
| 6,069,858 A | * | 5/2000 | Endo et al. | 369/75.1 |

* cited by examiner

Primary Examiner—Muhammad Edun
(74) Attorney, Agent, or Firm—Rosenberg, Klein & Lee

(57) ABSTRACT

A method for determining vertical or horizontal operation of optical disk driver is proposed. A feedback signal from a pick-up head of the optical disk driver is sent to a pre-amplifier to generate a focus error signal. The focus error signal is sent to a compensator to generate a compensation voltage. A low-pass filter removes high-frequency components of the compensation voltage to obtain a DC component of the compensation voltage. A comparator compares the DC component of the compensation voltage with a predetermined threshold value to discriminate the vertical or horizontal operation of optical disk driver.

3 Claims, 2 Drawing Sheets

METHOD FOR DETERMINING VERTICAL OR HORIZONTAL OPERATION OF OPTICAL DISK DRIVER

FIELD OF THE INVENTION

The present invention relates to a method for determining vertical or horizontal operation of optical disk driver, especially to method for determining vertical or horizontal operation of optical disk driver by comparing the DC component of a compensation voltage of the optical disk driver with a predetermined threshold value.

BACKGROUND OF THE INVENTION

FIG. 1 shows a prior art close-loop control system for an optical disk driver. As shown in this figure, the feedback signal a from the pick-up head is sent to a pre-amplifier 11a to generate a focus error signal b. The focus error signal b is sent to a compensator 12a to generate a compensation voltage c. The compensation voltage c is sent to a motor driver 13a to driver an objective lens of the optical disk driver such that the laser light from the optical disk driver can be focused on the optical disk to be read. In other word, the objective lens has such a position to keep the optical disk in focal length of the laser light from the optical disk driver. When the optical disk driver is operated in horizontal arrangement, the compensation voltage c contains a DC bias to offset the effect due to the weight of the objective lens. When the optical disk driver is operated in vertical arrangement, the effect due to the weight of the objective lens influences the tracking of the optical disk driver and the compensation voltage c no longer contains the DC bias.

However, the close-loop control system for an optical disk driver can not detect the DC bias of the compensation voltage c. Therefore, close-loop control system is unaware of the operation arrangement (horizontal arrangement or vertical arrangement) of the optical disk driver.

SUMMARY OF THE INVENTION

It is an object of the present invention to provide a method for determining vertical or horizontal operation of optical disk driver, thus overcoming the above-mentioned drawbacks.

To achieve above object, the present invention provides a method for determining vertical or horizontal operation of optical disk driver. A feedback signal from a pick-up head of the optical disk driver is sent to a pre-amplifier to generate a focus error signal. The focus error signal is sent to a compensator to generate a compensation voltage. A low-pass filter removes high-frequency components of the compensation voltage to obtain a DC component of the compensation voltage. A comparator compares the DC component of the compensation voltage with a predetermined threshold value to discriminate the vertical or horizontal operation of optical disk driver. If the DC component of the compensation voltage is smaller than the predetermined threshold value; the vertical operation is discriminated. If the DC component of the compensation voltage is larger than the predetermined threshold value; the horizontal operation is discriminated.

The various objects and advantages of the present invention will be more readily understood from the following detailed description when read in conjunction with the appended drawing, in which:

DETAILED DESCRIPTION OF THE INVENTION

Figure 1:
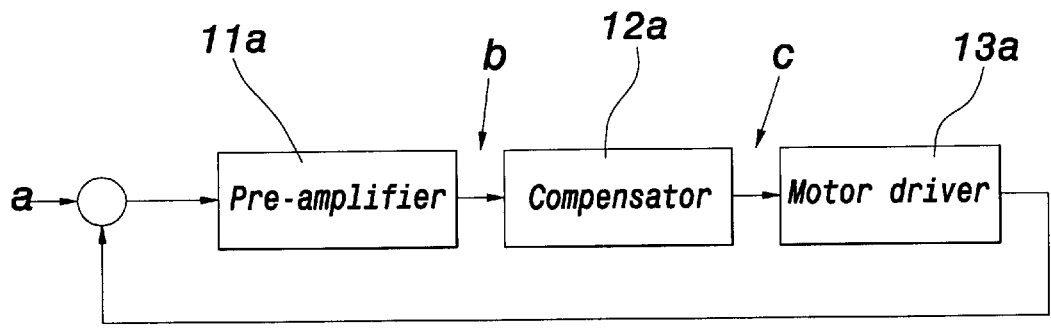
FIG. 1 shows a prior art close-loop control system for an optical disk driver.
Figure 2:
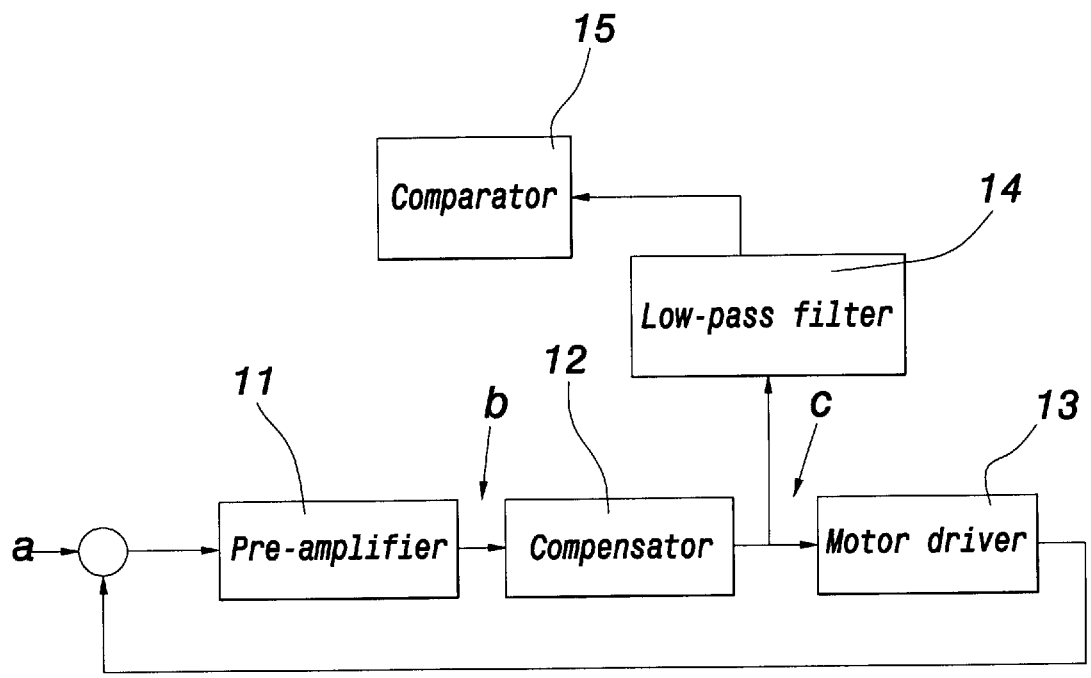
FIG. 2 shows block diagram of the improved close-loop control system for optical disk driver.

FIG. 2 shows block diagram of the improved close-loop control system for optical disk driver. The improved close-loop control system of the present invention comprises a pre-amplifier 11, a compensator 12, a motor driver 13, a low-pass filter 14 and a comparator 15. The compensator 12 is connected to the output of the pre-amplifier 11. The motor driver 13 is connected between the output of the compensator 12 and the input of the pre-amplifier 11 to form a close loop. The low-pass filter 14 is connected between the output of the compensator 12 and the input of comparator 15 to filter the signal output from the compensator 12. The filtered signal is then analyzed by comparison operation of the compensator 12.

Figure 3:
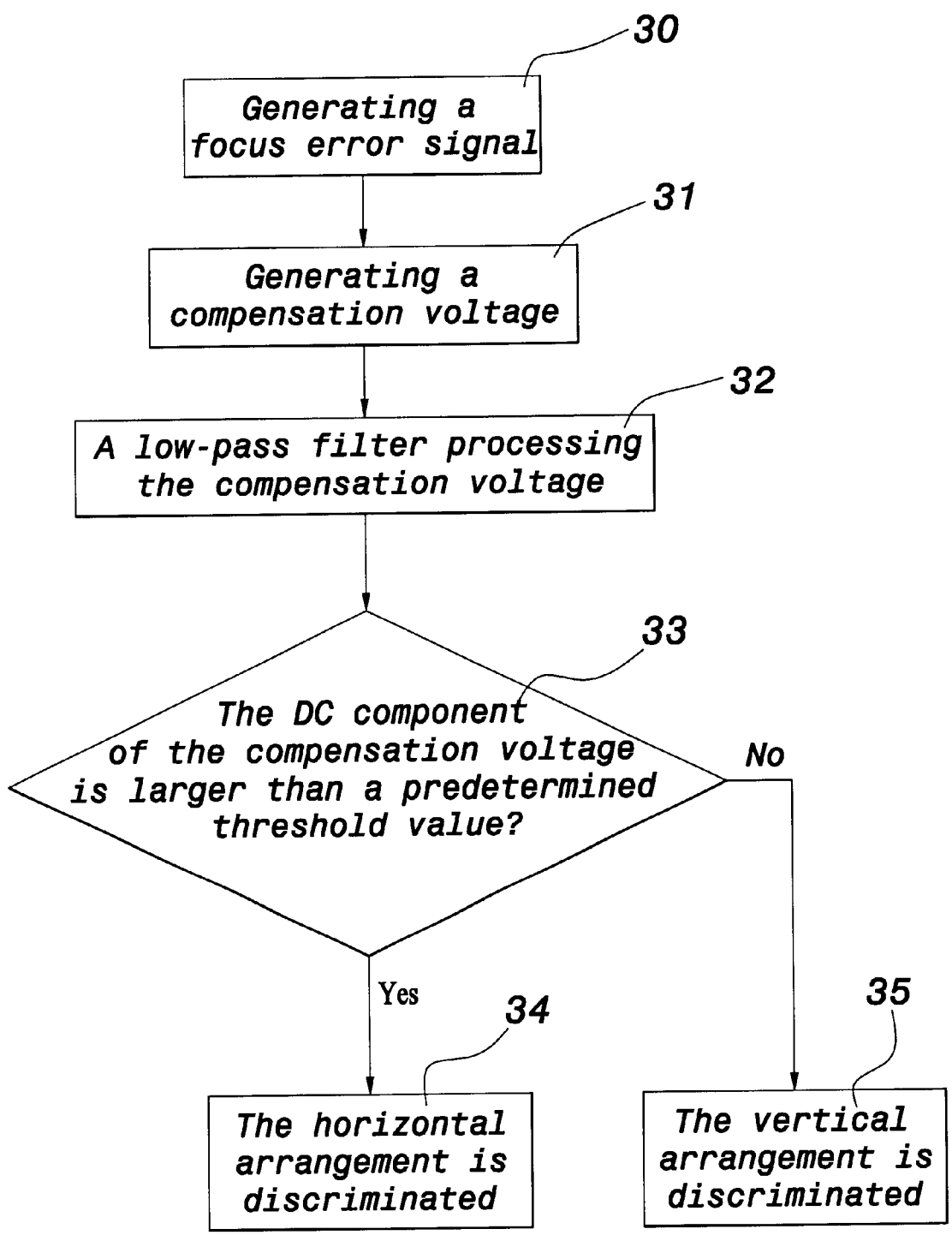
FIG. 3 shows the flowchart of the method for determining vertical or horizontal operation of optical disk driver according to the present invention.

FIG. 3 shows the flowchart of the method for determining vertical or horizontal operation of optical disk driver according to the present invention, the method of the present invention comprising following steps:

Step 30: the feedback signal a from the pick-up head is sent to a pre-amplifier to generate a focus error signal b;

Step 31: the focus error signal b is sent to a compensator to generate a compensation voltage c;

Step 32: the low-pass filter removes the high-frequency component of the compensation voltage c to obtain the DC component of the compensation voltage c;

Step 33: the comparator compares the DC component of the compensation voltage c with a predetermined threshold value. If the DC component of the compensation voltage c is smaller than the predetermined threshold value; the vertical arrangement is discriminated in step 35.

Step 34: the DC component of the compensation voltage c is larger than the predetermined threshold value; the horizontal arrangement is discriminated.

Moreover, the low-pass filter and the comparator can be replaced by firmware with similar functions to reduce cost.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method for determining vertical or horizontal operation of optical disk driver comprising following steps:

(a) a feedback signal from a pick-up head of the optical disk driver is sent to a pre-amplifier to generate a focus error signal;

(b) the focus error signal is sent to a compensator to generate a compensation voltage;

(c) a low-pass filter removes high-frequency components of the compensation voltage to obtain a DC component of the compensation voltage;

(d) a comparator compares the DC component of the compensation voltage with a predetermined threshold value; if the DC component of the compensation voltage is smaller than the predetermined threshold value; the vertical operation is discriminated; if the DC component of the compensation voltage is larger than the predetermined threshold value; the horizontal operation is discriminated.

2. The method for determining vertical or horizontal operation of optical disk driver as in claim 1, wherein in step (c), the low-pass filter can be replaced by firmware with similar function.

3. The method for determining vertical or horizontal operation of optical disk driver as in claim 1, wherein in step (d), the comparator can be replaced by firmware with similar function.

* * * * *